(12) United States Patent
Rachlin

(10) Patent No.: US 10,810,086 B2
(45) Date of Patent: Oct. 20, 2020

(54) SYSTEM AND METHOD FOR EMULATION OF ENHANCED APPLICATION MODULE REDUNDANCY (EAM-R)

(71) Applicant: Honeywell International Inc., Morris Plains, NJ (US)

(72) Inventor: Elliott Rachlin, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 171 days.

(21) Appl. No.: 16/047,721

(22) Filed: Jul. 27, 2018

(65) Prior Publication Data

US 2019/0121702 A1 Apr. 25, 2019

Related U.S. Application Data

(60) Provisional application No. 62/574,665, filed on Oct. 19, 2017.

(51) Int. Cl.
| | |
|---|---|
| *G06F 12/00* | (2006.01) |
| *G06F 11/14* | (2006.01) |
| *G06F 3/06* | (2006.01) |
| *G05B 19/045* | (2006.01) |
| *G06F 11/20* | (2006.01) |

(52) U.S. Cl.
CPC ........ *G06F 11/1446* (2013.01); *G05B 19/045* (2013.01); *G06F 3/065* (2013.01); *G06F 3/0619* (2013.01); *G06F 3/0671* (2013.01); *G06F 11/202* (2013.01); *G06F 11/2007* (2013.01); *G06F 11/2097* (2013.01)

(58) Field of Classification Search
CPC .... G06F 11/1446; G06F 3/0619; G06F 3/065; G06F 3/0671; G06F 11/2007; G06F 11/202; G06F 11/2097; G05B 19/045; H04L 12/5689
See application file for complete search history.

(56) References Cited

U.S. PATENT DOCUMENTS

| | | | |
|---|---|---|---|
| 4,644,456 A | 2/1987 | Lydell | |
| 5,126,889 A | * 6/1992 | Walden | ........... G06F 11/08 360/53 |

(Continued)

FOREIGN PATENT DOCUMENTS

EP 04188501 A2 6/1992

OTHER PUBLICATIONS

"Packet analyzer," Wikipedia, Jan. 14, 2016, 4 pages.

(Continued)

*Primary Examiner* — Shawn X Gu

(57) ABSTRACT

A method includes emulating an Enhanced Application Module Redundancy (EAM-R) system that includes a primary EAM-R board and a secondary EAM-R board. Emulating the EAM-R system includes detecting that data received from a sensor has been written to a memory block associated with the primary EAM-R board, and sending instructions to a secondary computing device to write a copy of the data to a same memory block in the secondary computing device that is associated with the secondary EAM-R board. The EAM-R system is emulated in an emulation system that includes at least one network connection. The emulation system does not include a physical primary EAM-R board or a physical secondary EAM-R board.

20 Claims, 3 Drawing Sheets

(56) References Cited

U.S. PATENT DOCUMENTS

| | | | |
|---|---|---|---|
| 5,220,653 A | 6/1993 | Miro | |
| 5,630,128 A | 5/1997 | Farrell et al. | |
| 5,970,236 A | 10/1999 | Galloway et al. | |
| 6,442,634 B2 | 8/2002 | Bronson et al. | |
| 6,519,605 B1 | 2/2003 | Gilgen et al. | |
| 6,779,182 B1 | 8/2004 | Zolnowsky | |
| 7,047,321 B1 | 5/2006 | Endo | |
| 7,234,139 B1 | 6/2007 | Feinberg | |
| 7,565,631 B1 | 7/2009 | Banerjee et al. | |
| 7,590,982 B1 | 9/2009 | Weissman | |
| 7,748,001 B2 | 6/2010 | Burns et al. | |
| 8,635,621 B2 | 1/2014 | Levitan et al. | |
| 10,025,727 B2 | 7/2018 | Rachlin et al. | |
| 10,039,544 B2 | 8/2018 | Euteneuer et al. | |
| 10,069,949 B2 | 9/2018 | Rachlin | |
| 10,089,090 B2 | 10/2018 | Rachlin et al. | |
| 2001/0021177 A1 | 9/2001 | Ishii | |
| 2002/0176371 A1 | 11/2002 | Behzadi | |
| 2003/0016624 A1 | 1/2003 | Bare | |
| 2004/0002845 A1* | 1/2004 | Akiba | G06F 30/33 703/14 |
| 2004/0073910 A1 | 4/2004 | Hokenek et al. | |
| 2004/0172631 A1 | 9/2004 | Howard | |
| 2005/0216635 A1 | 9/2005 | Nishimura | |
| 2006/0059485 A1 | 3/2006 | Onufryk et al. | |
| 2006/0075404 A1 | 4/2006 | Rosu et al. | |
| 2006/0184946 A1 | 8/2006 | Bishop et al. | |
| 2007/0091793 A1 | 4/2007 | Filsfils et al. | |
| 2007/0198980 A1 | 8/2007 | Kwon | |
| 2008/0028197 A1 | 1/2008 | Sawai | |
| 2009/0138682 A1 | 5/2009 | Capps, Jr. et al. | |
| 2009/0238080 A1 | 9/2009 | Hirano | |
| 2010/0077399 A1 | 3/2010 | Plondke et al. | |
| 2010/0229179 A1 | 9/2010 | Moore | |
| 2011/0258406 A1* | 10/2011 | Suetsugu | G06F 3/067 711/162 |
| 2011/0302588 A1 | 12/2011 | Cornwell et al. | |
| 2012/0023502 A1 | 1/2012 | Marr | |
| 2013/0111489 A1 | 5/2013 | Glew et al. | |
| 2013/0170504 A1 | 7/2013 | Shimokawa et al. | |
| 2014/0019710 A1 | 1/2014 | Kataoka et al. | |
| 2014/0164662 A1 | 6/2014 | van Schaik | |
| 2014/0282507 A1 | 9/2014 | Plondke et al. | |
| 2014/0310723 A1 | 10/2014 | Yamauchi et al. | |
| 2014/0373021 A1 | 12/2014 | Teixeira et al. | |
| 2015/0095569 A1* | 4/2015 | McLaren | G06F 3/0613 711/114 |
| 2015/0135183 A1 | 5/2015 | Kipp | |
| 2016/0065407 A1 | 3/2016 | Saltsidis | |
| 2016/0217197 A1 | 7/2016 | Rachlin | |
| 2016/0239345 A1 | 8/2016 | Rachlin | |
| 2017/0222895 A1 | 8/2017 | Rachlin | |
| 2017/0228225 A1 | 8/2017 | Rachlin | |
| 2017/0235520 A1 | 8/2017 | Rachlin et al. | |
| 2017/0344364 A1 | 11/2017 | Rachlin et al. | |

OTHER PUBLICATIONS

Partial European Search Report dated Aug. 17, 2016 in connection with European Patent Application No. 16151386.6, 7 pages.

Office Action dated Sep. 1, 2016 in connection with U.S. Appl. No. 14/622,465, 24 pages.

Extended European Search Report dated Jun. 23, 2016 in connection with European Patent Application No. 16154359.0, 7 pages.

\* cited by examiner

US 10,810,086 B2

SYSTEM AND METHOD FOR EMULATION OF ENHANCED APPLICATION MODULE REDUNDANCY (EAM-R)

CROSS-REFERENCE TO RELATED APPLICATION AND PRIORITY CLAIM

This application claims priority under 35 U.S.C. § 119(e) to U.S. Provisional Patent Application No. 62/574,665, which was filed on Oct. 19, 2017. The provisional application is hereby incorporated by reference in its entirety.

TECHNICAL FIELD

This disclosure relates generally to industrial process control and automation systems, such as in the refining, petrochemical, pulp and paper, and power generation fields. More specifically, this disclosure relates to a system and method for emulation of enhanced application module redundancy (EAM-R).

BACKGROUND

Enhanced Application Module Redundancy (EAM-R) refers to a system and technique for achieving redundancy among processes and components in industrial process control and automation systems, such as supervisory computers or controllers. EAM-R systems are currently supplied as hardware and associated software. Some of the hardware depends on 68040 processors, which have reached end-of-life and can be difficult to obtain. However, the functionality of EAM-R remains highly desirable in control systems.

SUMMARY

This disclosure provides a system and method for emulation of enhanced application module redundancy (EAM-R).

In a first embodiment, a method includes emulating an Enhanced Application Module Redundancy (EAM-R) system that includes a primary EAM-R board and a secondary EAM-R board. Emulating the EAM-R system includes detecting that data received from a sensor has been written to a memory block associated with the primary EAM-R board, and sending instructions to a secondary computing device to write a copy of the data to a same memory block in the secondary computing device that is associated with the secondary EAM-R board. The EAM-R system is emulated in an emulation system that includes at least one network connection. The emulation system does not include a physical primary EAM-R board or a physical secondary EAM-R board.

In a second embodiment, an apparatus includes an emulation system for emulating an EAM-R system that includes a primary EAM-R board and a secondary EAM-R board. The emulation system includes a primary computing device, a secondary computing device, and at least one data communications cable connecting the primary computing device and the secondary computing device. To emulate the EAM-R system, the primary computing device is configured to detect that data received from a sensor has been written to a memory block associated with the primary EAM-R board, and send instructions to the secondary computing device to write a copy of the data to a same memory block in the secondary computing device that is associated with the secondary EAM-R board. The emulation system does not include a physical primary EAM-R board or a physical secondary EAM-R board.

In a third embodiment, a non-transitory computer readable medium contains instructions that, when executed by at least one processing device, cause the at least one processing device to emulate an EAM-R system that includes a primary EAM-R board and a secondary EAM-R board. Emulating the EAM-R system includes detecting that data received from a sensor has been written to a memory block associated with the primary EAM-R board, and sending instructions to a secondary computing device to write a copy of the data to a same memory block in the secondary computing device that is associated with the secondary EAM-R board. The at least one processing device is part of an emulation system that includes at least one network connection. The emulation system does not include a physical primary EAM-R board or a physical secondary EAM-R board.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described in this patent document. Omission of a feature or component from a particular figure is for purposes of simplicity and clarity and is not meant to imply that the feature or component cannot be employed in the embodiment(s) described in connection with that figure.

Figure 1:
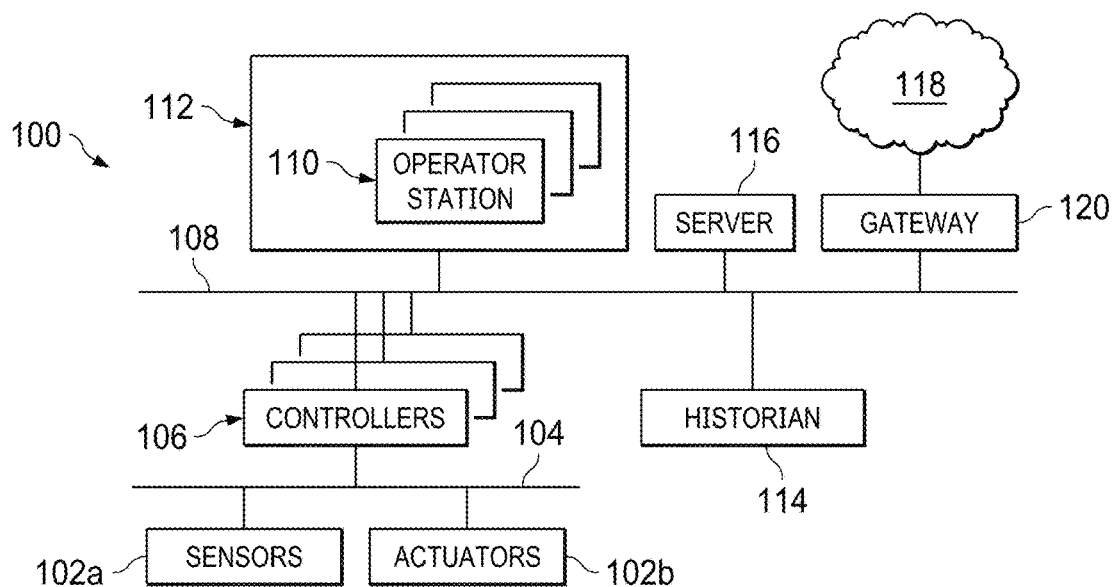
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to the operator, such as values of various process variables and warnings, alarms, or other states associated with the industrial process. Each operator station 110 could request information affecting how the industrial process is controlled, such as by requesting setpoints or control modes for process variables controlled by the controllers 106 or other information that alters or affects how the controllers 106 control the industrial process. This could include requesting this information from the controllers 106 or from other devices such as historian 114 or servers 116. In response to such requests, each operator station 110 could receive the requested information. Each operator station 110 includes any suitable structure for displaying information to and interacting with an operator. For example, each operator station 110 could represent a computing device running a WINDOWS operating system or other operating system.

Multiple operator stations 110 can be grouped together and used in one or more control rooms 112. Each control room 112 could include any number of operator stations 110 in any suitable arrangement. In some embodiments, multiple control rooms 112 can be used to control an industrial plant, such as when each control room 112 contains operator stations 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator stations 110 or other applications. The applications could be used to support various functions for the operator stations 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

As described in more detail below, one or more components of the system 100 could function as application modules (AMs) or enhanced application modules (E-AMs), which provide supervisory control functions in the system 100. Some of the AMs or E-AMs can be arranged in pairs or groups to support redundancy in the system 100. In particular, some of the AMs or E-AMs can be configured to support emulation of older ("legacy") EAM-R functions. For example, this functionality could be implemented in one or more controllers 106, operator stations 110, servers 116, or devices in the computing cloud 118. The emulation of EAM-R can be performed to maintain effectiveness of operation of one or more components of the system 100. Additional details regarding this functionality are provided below.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where emulation of EAM-R can be performed. This functionality can be used in any other suitable system.

In some process control systems, such as the system 100, certain computing devices (e.g., controllers 106) perform EAM-R techniques to achieve redundancy requirements or greater fault tolerance. In legacy control systems, the computing devices included one or more EAM-R boards in addition to a 68040 processor board to perform EAM-R. The EAM-R boards were used to achieve the redundancy objectives. In newer systems, both the 68040 processor and the EAM-R boards are replaced with more current hardware and software, but the redundancy objectives achieved using the EAM-R boards are still important for compatibility with other components. To address this and other issues, embodiments of this disclosure emulate the unique functions of EAM-R without the physical presence of the EAM-R boards. That is, control systems in accordance with this disclosure do not include the original hardware used for EAM-R (e.g., the 68040 processor or the EAM-R boards) but such control systems are configured to emulate those hardware and processes.

In general, EAM-R includes two computing devices (e.g., computers)—primary and secondary—that are used in an industrial process (e.g., in a refinery, a power plant, a paper mill, or the like). Depending on the system, the two computing devices can represent different types of devices, such as supervisory control computers, application modules (AMs), controllers, and the like. The two computing devices are connected by two ribbon cables. The ribbon cables allow for fast communication and tight synchronization between the primary and secondary computing devices. The primary computing device performs control functions in the industrial process. Actions that occur and data that is stored in the primary computing device are emulated or copied at the secondary computing device using the EAM-R functionality, so that if the primary computing device fails, the secondary computing device can assume the responsibilities of the primary computing device. Communication across the ribbon cables is bidirectional and includes both data and control signals. Control signals include information of when data is available on a wire. Control signals can also include acknowledgements of receipt of data.

Each ribbon cable includes a plurality of pins (e.g., 50 pins arranged in 25 pairs), where each pair of pins is associated with a control signal channel (e.g., handshaking, acknowledgment, error, clock, status, etc.) or a data communications channel. In typical implementations, the two ribbon cables are not redundant to each other. That is, each of the two ribbon cables has a different pin layout, such that there is a total of 50 (2×25) different communication channels.

Figure 2:
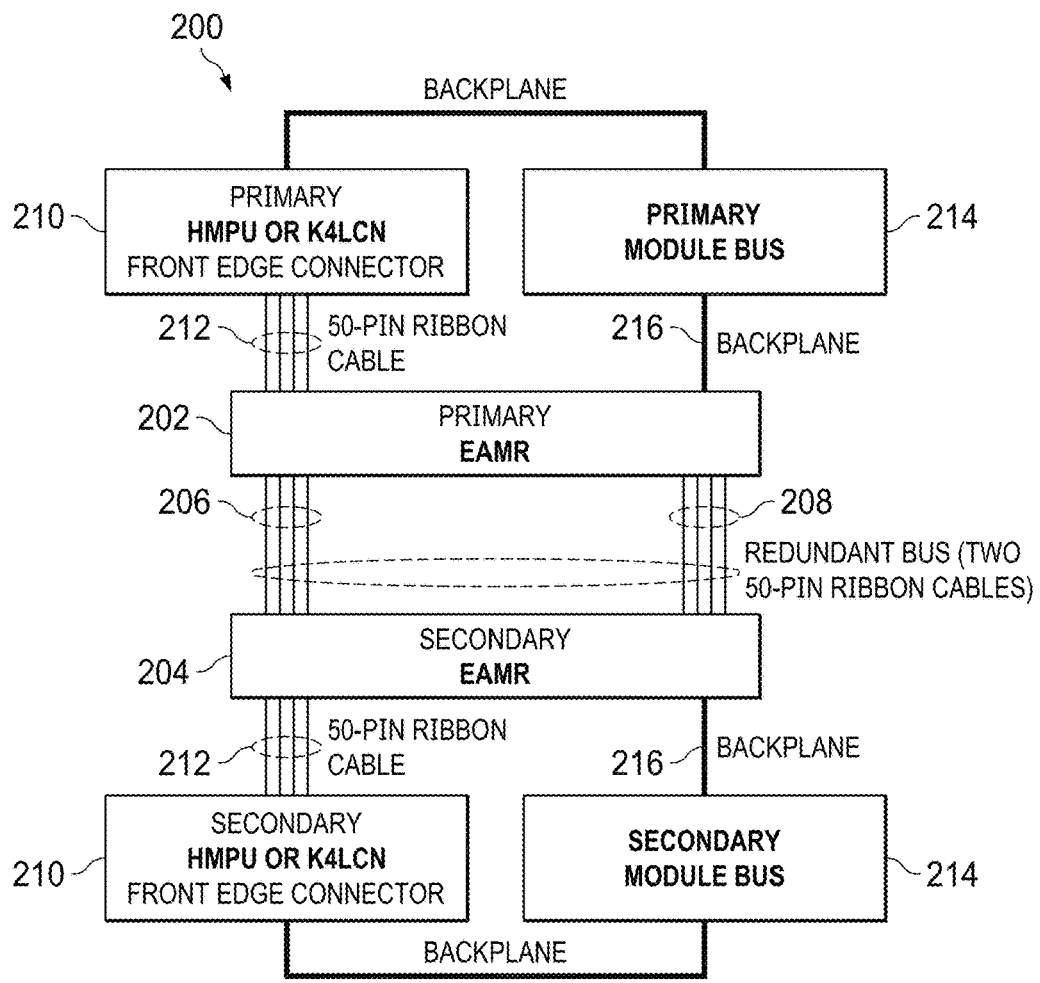
FIG. 2 illustrates an example system in which enhanced application module redundancy (EAM-R) is used according to this disclosure.

FIG. 2 illustrates an example system 200 in which EAM-R is used according to this disclosure. The system 200 may represent (or be represented by) one or more of the components of FIG. 1. As shown in FIG. 2, the system 200 includes a primary EAM-R board (also referred to as simply an "EAMR") 202 and a secondary EAMR 204. The primary EAMR 202 and the secondary EAMR 204 are disposed in separate computing devices (not specifically shown) but are connected by a redundant bus formed by two 50-pin ribbon cables 206-208. Each EAMR 202-204 is also connected to a High Performance Module Processing Unit (HMPU) or Combined Kernel Local Control Network Interface (K4LCN) front edge connector 210 via a 50-pin ribbon cable 212. Each EAMR 202-204 is also connected to a module bus 214 via a backplane 216 of the computing device associated with each EAMR 202-204. Both EAMRs 202-204 contain identical (or substantially identical) circuitry but have two selectable modes of operation—primary mode or secondary mode. With the aid of kernel memory in the secondary computing device, the pair of EAMRs 202-204 keep the secondary kernel memory updated with the changing database memory in the primary EAMR. Details of primary mode and secondary mode will now be explained.

Primary Mode

Address Range Comparison (HMPU vs. K4LCN)

The primary EAMR 202 has two comparison registers—BEGINNING COMPARE ADDRESS register and ENDING COMPARE ADDRESS register—to which the kernel of the primary computing device writes and stores the address limits of the database memory. Although these registers are intended for use only when an HMPU is the implemented kernel, they can also be written, for diagnostic purposes, by the K4LCN. Any writes to this section of memory (defined by the contents of the two registers) by the HMPU causes the address and data to be sent to the secondary EAMR 204 for storage in its buffer space. Since the comparison registers do not contain the additional address bits from the K4LCN, use of the address registers for address detection is intended only when an HMPU is equipped.

Similarly, in the K4LCN implementation, the address and data is transmitted to the secondary EAMR 204 as well. Line transfers by the K4LCN to this defined area of memory are burst-inhibited on the K4LCN by an in-range signal. The in-range signal also slows the current K4LCN bus cycle to accommodate the lower speed requirements of the EAMR.

For normal operation with a K4LCN, the two address range comparison registers and associated comparison circuitry can be disabled so that the comparison circuitry does not conflict with the function of the in-range signal. This is done by storing invalid address range data in the comparison registers. Specifically, the ENDING COMPARE ADDRESS register can be written with a value less than the value written to the BEGINNING COMPARE ADDRESS register.

When the K4LCN diagnoses the EAMR comparison registers and circuitry, it may be necessary for the K4LCN to force the EAMR into HMPU mode so that the in-range signal, which forces the K4LCN access cycle to be compatible with the EAMR, is not detected by the EAMR. Thus, the EAMR can generate a redundant cycle based upon EAMR address comparison only and not by the state of the in-range signal.

Primary Mode Protocol

The data to be written to the secondary EAMR 204 is framed in blocks by "Clean Points." The primary EAMR 202 receives a BEGIN CLEAN POINT command from the kernel and sends this message in the command field of the data packets which are sent when a write to the data space is detected. When the system software arrives at an update point, it sends an END CLEAN POINT command to the primary EAMR 202. The primary EAMR 202 sends this command to the secondary EAMR 204 when the next write to the data space is detected. This means the primary kernel writes a dummy word to an address in the data space in order for the END CLEAN POINT command to be sent. The value of the dummy word written by the primary does not matter; it is written only so that the END CLEAN POINT command will be sent to the secondary EAMR 204.

The secondary EAMR 204, upon reception of this message, can switch buffers. The write buffer becomes the read buffer and the just-emptied read buffer becomes the write buffer. The secondary kernel is interrupted and informed via a status bit that the secondary EAMR 204 has a buffer to be read. When the secondary kernel has reached the END CLEAN POINT code in the buffer, it signals the secondary EAMR 204 through the command BUFFER EMPTIED that the entire clean point packet has been received. The secondary EAMR 204 signals the primary EAMR 202 that a CLEAN POINT ACKNOWLEDGE has occurred. Both of the EAMR boards 202-204 inform their respective kernels with an interrupt and set the appropriate bit in their respective OPERATIONAL STATUS registers indicating CLEAN POINT ACKNOWLEDGE.

The primary EAMR 202 does not store any data. Addresses, data and status from the redundant write are transferred in blocks to the secondary EAMR 204 over the redundant bus 206-208. The transfers are made to be synchronous to the primary memory cycle. For HMPU implementations, the redundancy data packet contains packet type, size, address, data, and parity information. The K4LCN implementation packet type contains much of the same information but differs in format. Parity for each byte is carried through the system and checked in several places. (Parity sense differs, depending upon where in the redundancy system it is generated and checked.)

Secondary Mode

The secondary mode programs the secondary computing device to receive data over the redundant backplane and to transfer it into buffer memory on the secondary EAMR 204. This memory is configured as a packet buffer organized as two banks. The two banks each have support circuitry to count addresses and handle packet type decode and error conditions. At any one time, one bank is configured as a write buffer and the other bank as a read buffer. The write buffer timing is controlled over the redundant bus 206-208 to be synchronous with the memory cycle of the primary write. After a CLEAN POINT BEGIN—CLEAN POINT END sequence, or a CLEAN POINT BEGIN—STOP STORES sequence, the read buffer appears in the secondary kernel's address space where the data can be read (but not written) by the kernel processor.

There are four synchronizing signals between the secondary EAMR 204 and the corresponding kernel in secondary operation. One is a CLEAN POINT END DETECTED signal, which appears in an OPERATIONAL STATUS register. The second is the STOP STORES command, which the secondary kernel issues to the secondary EAMR 204. The third is a STOP STORES ACKNOWLEDGE signal, which appears in the OPERATIONAL STATUS register. And the fourth is a BUFFER EMPTIED command.

Under normal operations, after a SECONDARY MODE command and a BEGIN OPERATION command have been issued, data begins to appear from the primary computing device. When a BEGIN CLEAN POINT decode is detected in the status byte of the data, the secondary computing device begins to store the redundant data in its buffer memory. The second buffer is empty and not available at this point. When the secondary computing device detects an END GUARANTEED STORE command in the status byte of the data, it responds to the primary computing device with the END GUARANTEED STORE ACKNOWLEDGE signal. When the secondary computing device detects the END CLEAN POINT command in the status byte, it issues an interrupt with the END CLEAN POINT DETECTED flag set in the OPERATIONAL STATUS register of the secondary computing device. Since the other buffer is known to be empty, the secondary EAMR 204 switches buffers to make the write buffer the read buffer and the empty buffer the write buffer. The kernel responds to the END CLEAN POINT DETECTED interrupt by reading all data until it sees the END CLEAN POINT command in the status byte of the redundancy data. At this point the kernel issues the BUFFER EMPTIED command.

If an error in the primary computing device is detected by the system, the secondary computing device is given a command to end operation and then to switch to primary computing device. When the old primary is repaired and back on line, it is configured as a secondary, and redundancy can be resumed.

Typical Operational Procedure

The following is a typical sequence of issuing commands and procedures for proper operation of a pair of EAMR boards 202-204.

Before writing BEGIN OPERATION in either nodes
In the Primary:
    Write the Ending Compare Register
    Write the Beginning Compare Register
    Write the PRIMARY MODE command
    Write BEGIN OPERATION command
In the Secondary (asynchronous to the primary setup):
    Write the SECONDARY MODE command
Next (as determined through LCN or otherwise)
In the Secondary:
    Write the BEGIN OPERATION command
At any time from now until END OPERATION or ERROR
In the Primary:
    Write HANDSHAKE command
In the Secondary:
    Write HANDSHAKE command
    Write SECONDARY TAKEOVER command
    Write STOP STORES command
Next
In the Primary:
    Write BEGIN CLEAN POINT
loop:
At any time from now until END OPERATION or ERROR
In the Primary in order:
    Write BEGIN GUARANTEED STORE command
    Then at any time
        Write END GUARANTEED STORE command
Next
In the Primary:
    Write data to the comparison range
    Write END CLEAN POINT command
    Write dummy data to comparison range
    Write BEGIN CLEAN POINT command
    Write data to the comparison range
In the Secondary:
    Respond to END CLEAN POINT decode with
    Read data in the buffer Write BUFFER EMPTIED command
Next
In the Primary:
    Repeat procedures starting at 'loop'
In the Secondary:
    Repeat Procedures starting at 'loop'

Having described a typical EAM-R system and typical operating procedures used in such an EAM-R system, it will be understood that such a system and techniques can be emulated without the presence of the EAM-R specific hardware. According to embodiments of this disclosure, the EAMRs 202-204 and the ribbon cables 206, 208, 212 can be replaced with data communications cables (e.g., Ethernet cables), and the hardware and functionality associated with the EAMRs 202-204 and ribbon cables 206, 208, 212 (e.g., the aforementioned interfaces, ports, pins, protocols, read/write operations, signals, computing operations, etc.) can be emulated using the data communications cables, one or more processors, one or more memories, and software instructions. In particular, the primary mode, the secondary mode, and the typical operating procedure described above can be emulated using these components. The emulation according to this disclosure takes into account and emulates data packets, data packet format, data packet status bits, software interfaces, software registers (including hardware status register, configuration status register, interrupts, command registers, etc.), register definitions, register addresses, and the like.

Figure 3:
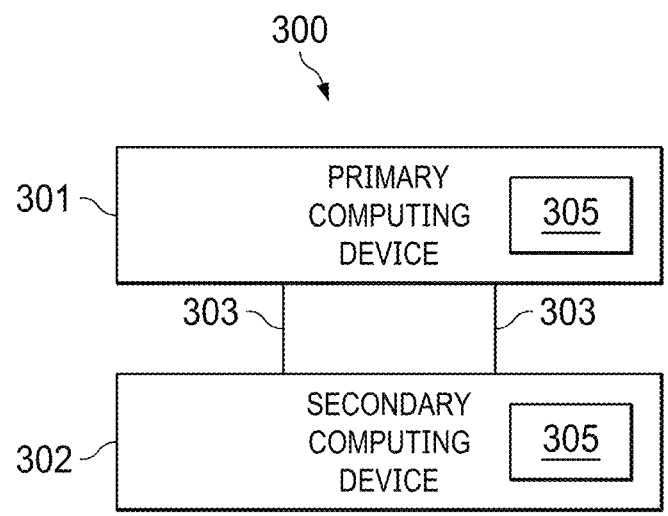
FIG. 3 illustrates an example system in which EAM-R is emulated according to this disclosure.

FIG. 3 illustrates an example system 300 in which EAM-R is emulated according to this disclosure. The various components of the system 300 could represent (or be represented by) one or more components in the system 100 of FIG. 1. However, the system 300 could be used in any other suitable system.

As shown in FIG. 3, the system 300 includes a primary computing device 301 and a secondary computing device 302 connected by two or more data communications cables 303. Those of skill in the art will understand that the system 300 can include other components (e.g., sensors, actuators, networks, operator stations, and the like). However, for ease of explanation, a detailed description of those components is not included. Depending on the embodiment, the computing devices 301-302 can represent different types of devices, such as supervisory control computers, application modules (AMs), controllers, and the like. However, in general, the computing devices 301-302 are substantially the same (or identical) computing devices that operate together to achieve redundancy in the system 300.

Unlike the computing devices referenced in the system 200, the primary computing device 301 and the secondary computing device 302 do not include EAMR cards. Moreover, since there are no EAMR cards, the system 300 does not include ribbon cables, such as the ribbon cables 206-208. However, the EAM-R functionality of the system 200 (e.g., the primary mode, the secondary mode, and the typical operating procedure described above) can be emulated in the system 300 using the primary computing device 301, the secondary computing device 302, and the data communications cables 303. The data communications cables 303 support a network connection between the computing devices 301-302. In some embodiments, the data communications cables 303 are Ethernet cables and the network connection is an Ethernet connection. Thus, EAM-R related communication signals that are carried over the ribbon cables 206-208 in the system 200 are instead encapsulated according to network communication protocols (e.g., Ethernet protocols) and carried over the data communications cables 303 in the system 300.

As in the system 200, the system 300 can be used for redundancy in an industrial process. For example, the primary computing device 301 can perform control functions in the industrial process. Actions that occur and data that is stored in the primary computing device 301 are emulated or copied at the secondary computing device 302 using the emulated EAM-R functionality. More specifically, the memory data in the primary computing device 301 and the secondary computing device 302 are kept the same so that if the primary computing device fails 301, the secondary computing device 302 can rapidly assume the control responsibilities of the primary computing device 301. Communication across the data communications cables 303 is bidirectional and includes both data and control signals.

In one aspect of operation, emulating an EAM-R system can include detecting that data received from a sensor has been written to a memory block associated with the primary EAM-R board, and then sending instructions to the secondary EAM-R board to write a copy of the data to a same memory block in the secondary EAM-R board. In the system 300, each of the computing devices 301-302 includes one or more memory blocks 305 that are associated with emulating an EAM-R board or emulating EAM-R functions. The primary computing device 301 can detect that data received from a sensor has been written to the memory block 305 associated with emulating the primary EAM-R board, and then send instructions over the data communications cables 303 to the secondary computing device 302 to write a copy of the data to a same memory block 305 associated with emulating the secondary EAM-R board. Other EAM-R functions, such as those described above with respect to FIG. 2, can also be emulated using the system 300.

The emulation of EAM-R, using commodity data network communications (e.g., Ethernet) as a replacement for proprietary backplane and ribbon-cable communications, allows sustainment of the EAM-R functionality for years into the future. This allows support for existing installations as well as new product installations. Additionally, because the system 300 does not require EAMR cards or ribbon cables, the entire system 300 can be virtualized or simulated in a single computing device that can be used, e.g., for training or testing.

Figure 4:
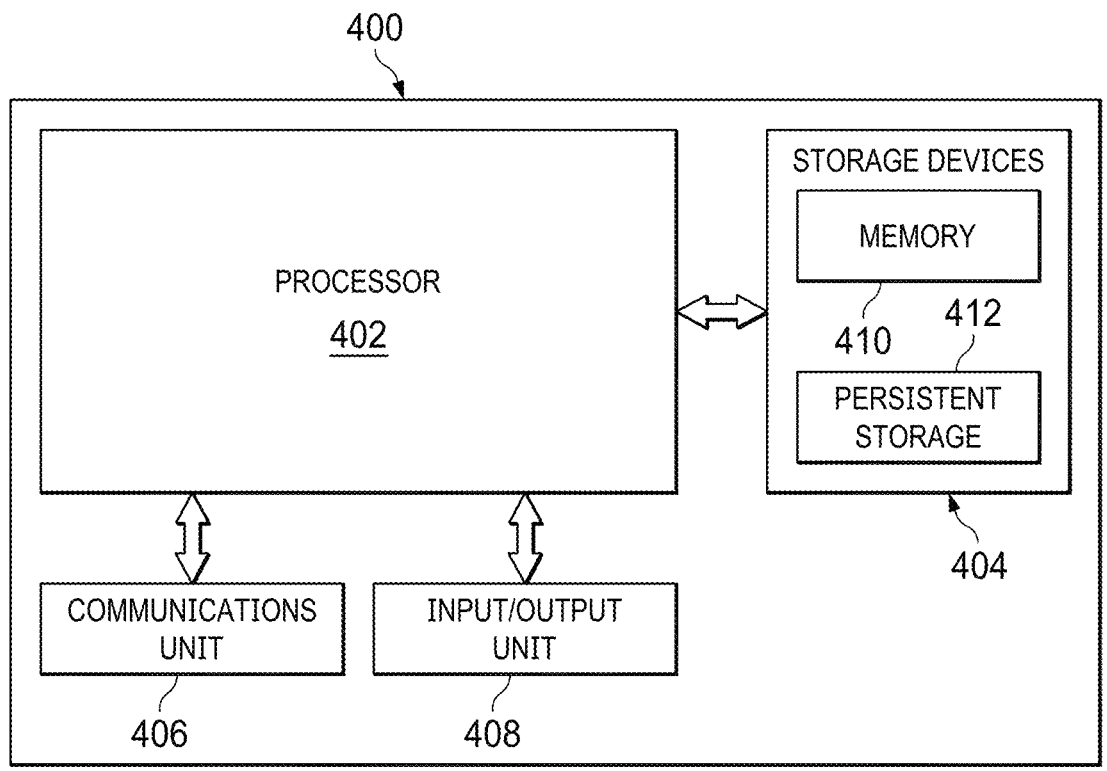
FIG. 4 illustrates an example device supporting emulation of EAM-R according to this disclosure.

FIG. 4 illustrates an example device 400 supporting emulation of EAM-R according to this disclosure. The device 400 could, for example, denote the primary computing device 301, the secondary computing device 302, or both, as described above with respect to FIG. 3. However, the device 400 could be used in any other suitable system.

As shown in FIG. 4, the device 400 includes at least one processor 402, at least one storage device 404, at least one communications unit 406, and at least one input/output (I/O) unit 408. Each processor 402 can execute instructions, such as those that may be loaded into a memory 410. The instructions could be associated with a process for emulation of EAM-R. Each processor 402 denotes any suitable processing device, such as one or more microprocessors, microcontrollers, digital signal processors, application specific integrated circuits (ASICs), field programmable gate arrays (FPGAs), or discrete circuitry.

The memory 410 and a persistent storage 412 are examples of storage devices 404, which represent any structure(s) capable of storing and facilitating retrieval of information (such as data, program code, and/or other suitable information on a temporary or permanent basis). The memory 410 may represent a random access memory or any other suitable volatile or non-volatile storage device(s). The persistent storage 412 may contain one or more components or devices supporting longer-term storage of data, such as a read only memory, hard drive, Flash memory, or optical disc. In accordance with this disclosure, the memory 410 and persistent storage 414 may be configured to contain instructions for emulation of EAM-R, such as depicted with the system 200 of FIG. 2.

The communications unit 406 supports communications with other systems or devices. For example, the communications unit 406 could include a network interface card or a wireless transceiver facilitating communications over a wired or wireless network. The communications unit 406 may support communications through any suitable physical or wireless communication link(s), such as Ethernet cables.

The I/O unit 408 allows for input and output of data. For example, the I/O unit 408 may provide a connection for user input through a keyboard, mouse, keypad, touchscreen, or other suitable input device. In accordance with this disclosure, the I/O unit 408 could include one or more Ethernet connections or Ethernet cables. The I/O unit 408 may also send output to a display, printer, or other suitable output device.

Although FIG. 4 illustrates one example of a device 400 supporting emulation of EAM-R, various changes may be made to FIG. 4. For example, components could be added, omitted, combined, further subdivided, or placed in any other suitable configuration according to particular needs. Also, computing devices can come in a wide variety of configurations, and FIG. 4 does not limit this disclosure to any particular configuration of computing device.

Figure 5:
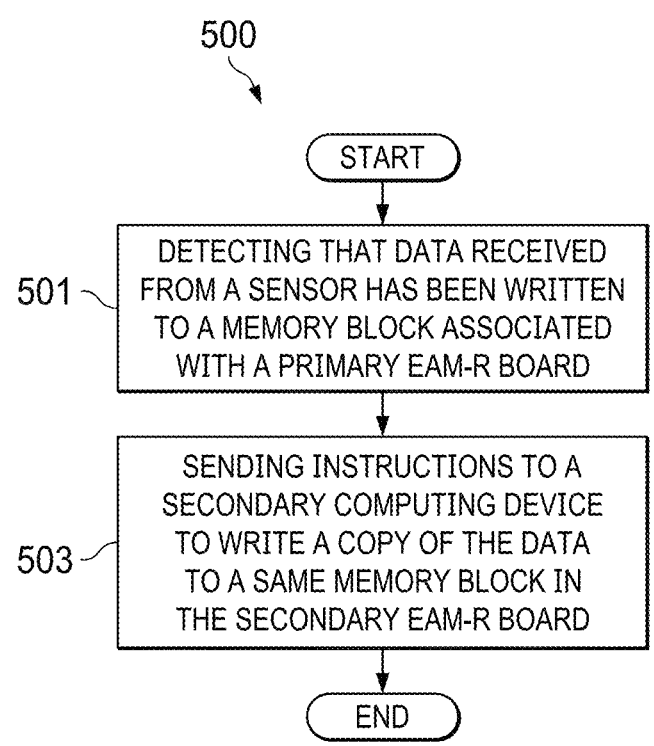
FIG. 5 illustrates an example method for emulation of EAM-R, according to this disclosure.

FIG. 5 illustrates an example method 500 for emulation of EAM-R, according to this disclosure. For ease of explanation, the method 500 is described as being performed using the system 300, which can include one or more computing devices 400 of FIG. 4. However, the method 500 could be used with any suitable device or system, such as one or more controllers 106 of FIG. 1.

The method 500 is for emulating an EAM-R system that includes a primary EAM-R board and a secondary EAM-R board. The EAM-R system is emulated in an emulation system that includes at least one network connection, such as the system 300. The emulation system does not include a physical primary EAM-R board or a physical secondary EAM-R board. The emulation can include the following operations.

At step 501, a computing device detects that data received from a sensor has been written to a memory block associated with the primary EAM-R board. This may include, for example, the primary computing device 301 detecting that data received from a sensor (e.g., a sensor 102a) has been written to a memory block 305 associated with the primary EAM-R board.

At step 503, the computing device sends instructions to a secondary computing device to write a copy of the data to a same memory block in the secondary computing device that is associated with the secondary EAM-R board. This may include, for example, the primary computing device 301 sending instructions to the secondary computing device 302 to write a copy of the data to a same memory block in the secondary computing device 302 that is associated with the secondary EAM-R board.

Later, if an event (e.g., a fault) occurs such that the primary computing device 301 becomes unavailable, the secondary computing device 302 is configured to take over and operate as a primary device.

As discussed above, in the E-AMR system that is emulated, the primary EAM-R board and the secondary EAM-R board are connected by two ribbon cables. However, the emulation system does not include the two ribbon cables. Instead, the emulation system includes at least one data communications cable, such as the data communications cables 303. The data communications cables support both bidirectional data exchange and bidirectional signal exchange.

Although FIG. 5 illustrates one example of a method 500 for emulation of EAM-R, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    emulating an Enhanced Application Module Redundancy (EAM-R) system that includes a primary EAM-R board and a secondary EAM-R board, wherein emulating the EAM-R system comprises:
        detecting that data received from a sensor has been written to a memory block associated with the primary EAM-R board, and
        sending instructions to a secondary computing device to write a copy of the data to a memory block associated with the secondary computing device that is associated with the secondary EAM-R board,
    wherein the EAM-R system is emulated in an emulation system that includes at least one network connection, and
    wherein the emulation system does not include a physical primary EAM-R board or a physical secondary EAM-R board.

2. The method of claim 1, wherein the primary EAM-R board and the secondary EAM-R board are connected by two ribbon cables, and wherein the emulation system does not include the two ribbon cables.

3. The method of claim 2, wherein the emulation system includes at least one Ethernet cable instead of the two ribbon cables.

4. The method of claim 3, wherein the at least one Ethernet cable supports both bidirectional data exchange and bidirectional signal exchange.

5. The method of claim 3, wherein the emulation system further includes a primary computing device and the secondary computing device connected by the at least one Ethernet cable.

6. The method of claim 5, wherein the secondary computing device is configured to operate as a primary device if the primary computing device becomes unavailable.

7. The method of claim 1, wherein the emulation system is part of an industrial process control and automation system.

8. An emulation system for emulating an Enhanced Application Module Redundancy (EAM-R) system that includes a primary EAM-R board and a secondary EAM-R board, the emulation system comprising:
    a primary computing device;
    a secondary computing device; and
    at least one data communications cable connecting the primary computing device and the secondary computing device;
    wherein to emulate the EAM-R system, the primary computing device is configured to:
        detect that data received from a sensor has been written to a memory block associated with the primary EAM-R board, and
        send instructions to the secondary computing device to write a copy of the data to a memory block associated with the secondary computing device that is associated with the secondary EAM-R board; and
    wherein the emulation system does not include a physical primary EAM-R board or a physical secondary EAM-R board.

9. The emulation system of claim 8, wherein the primary EAM-R board and the secondary EAM-R board are connected by two ribbon cables, and wherein the emulation system does not include the two ribbon cables.

10. The emulation system of claim 9, wherein:
    the at least one data communications cable comprises at least one Ethernet cable; and
    the emulation system includes the at least one Ethernet cable instead of the two ribbon cables.

11. The emulation system of claim 10, wherein the at least one Ethernet cable supports both bidirectional data exchange and bidirectional signal exchange.

12. The emulation system of claim 8, wherein the secondary computing device is configured to operate as a primary device if the primary computing device becomes unavailable.

13. The emulation system of claim 8, wherein the emulation system is part of an industrial process control and automation system.

14. A non-transitory computer readable medium containing instructions that, when executed by at least one processing device, cause the at least one processing device to:
    emulate an Enhanced Application Module Redundancy (EAM-R) system that includes a primary EAM-R board and a secondary EAM-R board, wherein emulating the EAM-R system comprises:
        detecting that data received from a sensor has been written to a memory block associated with the primary EAM-R board, and
        sending instructions to a secondary computing device to write a copy of the data to a memory block associated with the secondary computing device that is associated with the secondary EAM-R board,
    wherein the at least one processing device is part of an emulation system that includes at least one network connection, and
    wherein the emulation system does not include a physical primary EAM-R board or a physical secondary EAM-R board.

15. The non-transitory computer readable medium of claim 14, wherein the primary EAM-R board and the secondary EAM-R board are connected by two ribbon cables, and wherein the emulation system does not include the two ribbon cables.

16. The non-transitory computer readable medium of claim 15, wherein the emulation system includes at least one Ethernet cable instead of the two ribbon cables.

17. The non-transitory computer readable medium of claim 16, wherein the at least one Ethernet cable supports both bidirectional data exchange and bidirectional signal exchange.

18. The non-transitory computer readable medium of claim 16, wherein the at least one processing device comprises a primary computing device of the emulation system, wherein the emulation system further comprises the secondary computing device connected to the primary computing device by the at least one Ethernet cable.

19. The non-transitory computer readable medium of claim 18, wherein the secondary computing device is configured to operate as a primary device if the primary computing device becomes unavailable.

20. The non-transitory computer readable medium of claim 14, wherein the emulation system is part of an industrial process control and automation system.

* * * * *